United States Patent [19]

Ratcliffe

[11] 4,378,693

[45] Apr. 5, 1983

[54] DEFLECTION MEASURING SYSTEM

[75] Inventor: Edward L. Ratcliffe, Ottawa, Canada

[73] Assignee: Hambro International (Structures) Limited, Ottawa, Canada

[21] Appl. No.: 233,645

[22] Filed: Feb. 11, 1981

[51] Int. Cl.³ .............................................. G01B 5/28
[52] U.S. Cl. ...................................... 73/105; 340/689
[58] Field of Search ................... 73/105; 33/312, 366; 340/661, 689, 870.38; 338/151

[56] References Cited

U.S. PATENT DOCUMENTS 3,114,209  12/1963  Foody et al. ........................ 33/366
4,028,815   6/1977  Buckley et al. ..................... 33/366

Primary Examiner—Jerry W. Myracle
Attorney, Agent, or Firm—Wenderoth, Lind & Ponack

[57] ABSTRACT

A system for sensing the deviation of a surface, structure or the like from a reference axis is disclosed. A tilt sensitive transducer is used and this has two impedances the values of which vary differentially according to the angle and direction of tilt of the surface or member to which the transducer is mounted. Two equal but antiphase A.C. voltages are applied, respectively, to the two impedances and the current derived in each impedance is used to generate a D.C. voltage. The two D.C. voltages are compared to derive a difference D.C. voltage the magnitude and sign of which are dependent on the angle and direction, respectively, of tilt.

7 Claims, 4 Drawing Figures

DEFLECTION MEASURING SYSTEM

BACKGROUND OF THE INVENTION

The invention relates to systems for sensing deviation of a surface, structure or the like from a reference plane which may be, for example, a horizontal plane.

In such systems it has been known to use a tilt sensitive transducer which has two resistance values which vary according to the angle and direction of tilt. When the transducer is connected in an A.C. bridge circuit an output signal varying in amplitude and phase according to the angle and direction of tilt can be obtained. See, for example, U.S. Pat. No. 3,114,209 which issued Dec. 17, 1963 to Foody et al. In that patent there is no teaching of how the phase of the output signal is actually determined so as to determine the direction of tilt. Moreover, it is noted that the Foody circuit disclosed does not provide a reference voltage in terms of magnitude and phase and this presents a problem in processing the output signal.

SUMMARY OF THE PRESENT INVENTION

It is an object of the present invention to provide an improved deviation sensing system.

More particularly it is an object of the invention to provide such a system in which an output signal is obtained which indicates the direction and magnitude of the deviation.

These and other objects are achieved, according to the present invention, by a system for sensing deviation of a surface, structure or the like from a reference axis which system includes a tilt sensitive transducer having a first and a second impedance the values of which vary differentially according to the angle and direction of tilt. The system also includes means for applying an A.C. voltage across the first impedance, means for applying an antiphase A.C. voltage across the second impedance and rectifier means for deriving a positive D.C. voltage having a magnitude depending on the magnitude of the first impedance and deriving a negative D.C voltage having a magnitude depending on the magnitude of the second impedance. Means are provided for adding the positive D.C. voltage and the negative D.C. voltage to derive a D.C. voltage the magnitude of which is dependent on the angle of tilt and the sign of which is dependent on the direction of tilt.

DESCRIPTION OF THE PREFERRED EMBODIMENT

Figure 1:
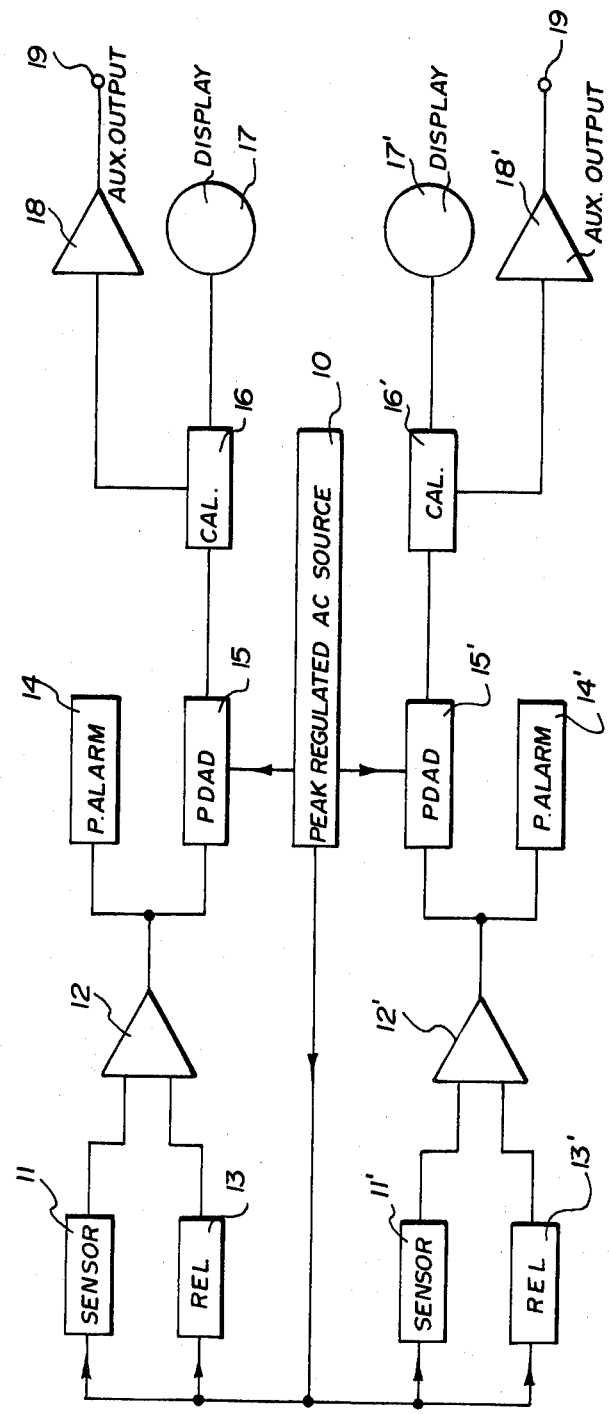
FIG. 1 is a block diagram of a deflection sensing system of the invention.

The system of claim 1 can be seen to comprise an A.C. source 10 arranged to supply two identical circuit halves each associated with a particular deflection sensing transducer or sensor 11, 11'. Because of the identity between the two circuit halves, essentially only one half will be described in detail, it being understood that the components of the other circuit half (which are given a prime notation in FIG. 1) and the operation of the other circuit half are identical to those of the first circuit half.

The sensors 11 and 11' are, for example, each in the form of an arcuate sealed glass tube partially filled with an electrolytic fluid, the remainder of the tube being filled with a gas bubble. A symmetrically spaced arrangement of three electrodes is provided on the inner surface of the tube in contact with the electrolytic fluid so that the resistances between two predetermined pairs of electrodes is dependent on the location of the gas bubble. With the sensor placed on a horizontal plane the bubble will be located centrally and the two resistance values will be identical. Movement of the sensor about a horizontal axis will cause the bubble to move, thus increasing one resistance value and decreasing the other. Such a sensor is described in U.S. Pat. No. 3,497,950 which issued on Mar. 3, 1970 to Squire et al. Similar sensors but with a slightly different electrode configuration are available from Spectron Glass.

The invention is not limited to the use of electrolytic sensors as any other type of deflection sensor which includes two resistances which vary in magnitude and sense according to the extent and direction of tilt may be used. For example, the sensor described in above mentioned U.S. Pat. No. 3,114,209 to Foody et al, would be suitable. This sensor also comprises an arcuate tube partially filled with a fluid and having a gas bubble. In this case, however, the fluid is one such as ethyl alcohol or kerosene which has good thermal conductivity and is electrically non-conductive and, instead of electrodes, two temperature sensitive resistance elements are used, movement of the bubble causing differential cooling of the resistance elements and thus differential resistance values.

The two sensors 11 and 11' are mounted in a suitable protective housing so as to rest on the same plane with the sensors disposed on two mutually perpendicular axes so as to sense deflection along these two axes.

The A.C. source 10 is arranged to provide to each circuit half, and, in particular to the sensor 11 or 11', two anti-phase equal amplitude A.C. voltages with respect to one common bus. The sensor 11 is connected to one input of a comparator 12, the signal supplied by the sensor 11 being dependent in amplitude and phase on the degree and direction of tilt of the sensor 11.

The two antiphase voltages are also supplied to a remote electronic leveling circuit (REL) 13 which is a variable means for deriving a voltage in phase with that produced by the sensor 11 and equal in magnitude to the sensor voltage *at a selected inclination of the sensor* 11. This is to compensate for situations where it is physically difficult or impossible to position the sensor 11 in a perfectly level plane or where the reference axis is intentionally non-horizontal or where, after an initial deflection, the sensor has to be reset to the new reference axis.

The output of REL 13 is supplied to the other input of the differential amplifier 12 which derives an output signal which varies in magnitude and phase depending on the deviation of the sensor from the reference axis. As stated above this reference is not necessarily lying in a horizontal plane but, in practice, it will be very close to being horizontal.

The output of amplifier 12 is fed to a programmable alarm 14 arranged to derive an alarm signal when the magnitude of the voltage output of amplifier 12 exceeds a programmable predetermined value corresponding to a predetermined magnitude of deviation from the reference level.

The output of amplifier 12 is also fed to a phase discrimination and amplitude detection circuit (PDAD) 15 also supplied by the A.C. source 10. The PDAD circuit 15 converts the output signal from amplifier 12 into a D.C. voltage the magnitude of which is proportional to the angle of inclination or deviation from the reference and the sense (positive or negative) of which is dependent on the direction of inclination of the sensor.

The output voltage of PDAD 15 is fed to a potentiometer 16 for calibrating the sensor 11 to a voltmeter display 17. The calibrated voltage may be supplied to a recording or transmitting device and, for this purpose, a buffer circuit 18 is used to provide an isolated auxiliary output 19.

Figure 2:
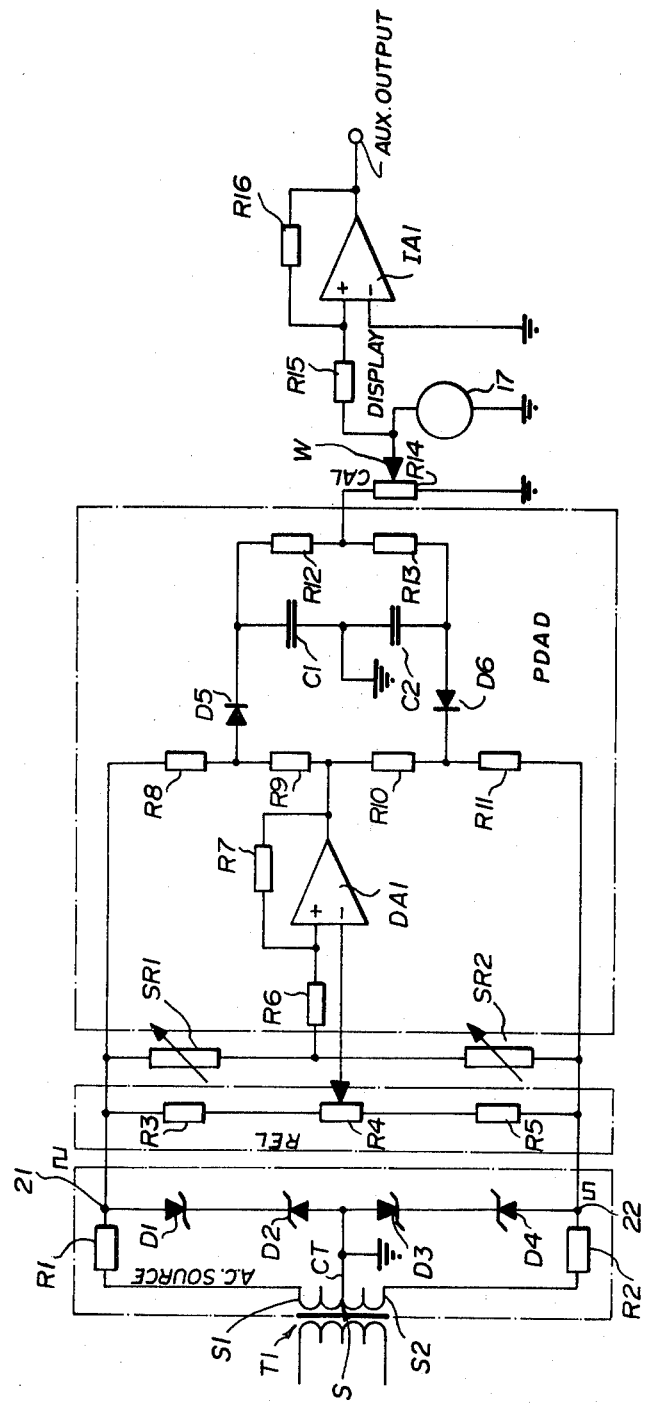
FIG. 2 is a circuit diagram of a portion of the system shown in FIG. 1.

Referring now to FIG. 2 which shows the detailed circuitry for only one sensor, namely sensor 11, the A.C. source 10 comprises a transformer T1 the secondary winding S of which is centre tapped. Identical resistors R1 and R2 are connected to each half S1 and S2 of the winding S and two pairs of zener diodes D1, D2 and D3, D4, the diodes of each pair being connected in opposition, are serially connected across resistors R1 and R2. The center tap CT is grounded and connected to the junction of diodes D2 and D3. The voltage derived at the point identified as 21 is essentially a square wave equal in magnitude but opposite in phase to the square wave derived at the point 22.

The sensor 11 is represented in FIG. 2 as two variable resistors SR1 and SR2 which are the two resistance values which vary according to the inclination of the sensor 11. Each antiphase square wave is, in effect, applied across the respective resistor SR1 or SR2 to derive a voltage depending upon the values of the resistors SR1 or SR2. The antiphase voltages derived across resistors SR1 and SR2 are applied through resistor R6 to one input of a differential amplifier DA1 formed as an integrated circuit.

The REL circuit 13 of FIG. 1 is formed as three resistors R3, R4 and R5 serially connected across the points 21 and 22. R4 is a variable resistor which can be set at any desired value to determine the reference position of the sensor 11. The voltage derived across the combination of R3 and part of R4 and the antiphase voltage derived across R5 and the remainder of R3 are applied to the second input of DA1. The difference between the voltages derived by the resistors SR1, SR2 and the voltages derived by the potential divider R3, R4 and R5 are amplified in DA1, the gain of which is controlled by resistor R7.

The PDAD 15 of FIG. 1 is a symmetrical circuit connected across the points 21 and 22. It comprises series connected resistors R8, R9, R10 and R11, the junction of R9 and R10 being connected to the output of DA1. Two resistors R12 and R13 in series are connected between the junction of resistors R8 and R9 and the junction of resistors R10 and R11 via two oppositely connected diodes D5 and D6. Two smoothing capacitors C1 and C2 are connected across resistors R12 and R13, the junction of capacitors C1 and C2 being grounded. The output of the PDAD is taken at the junction of resistors R12 and R13.

A voltage, the magnitude of which is dependent on the voltage across SR1, the voltage across R3 and part of R4, the gain of DA1 and the values of resistors R8 and R9, is obtained at the junction of R8 and R9. This voltage is rectified into negative pulses by diode D5, these pulses being smoothed by capacitor C1 into a negative D.C. voltage appearing across R12.

Similarly, a voltage, the magnitude of which is dependent on the voltage across SR2, the voltage across R5 and part of R4, the gain of DA1 and the values of resistors R10 and R11, is obtained at the junction of R10 and R11. This voltage is, of course, in phase opposition to the voltage obtained at the junction of R8 and R9 and is rectified by diode D6 and smoothed by capacitor C2 to provide a D.C. positive voltage across resistor R13.

The resulting voltage at the junction of R12 and R13 is the sum of the negative voltage on R12 and the positive voltage on R13.

The potentiometer 16 is represented in FIG. 2 as a grounded resistance R14 and wiper W providing an input to the grounded display 17.

The buffer circuit 18 of FIG. 1 is represented by a resistor R15 serially connected to the input of an inverting amplifier IA1, which may be formed as an I.C. The ain of IA1 is controlled by resistor R16.

Figure 3:
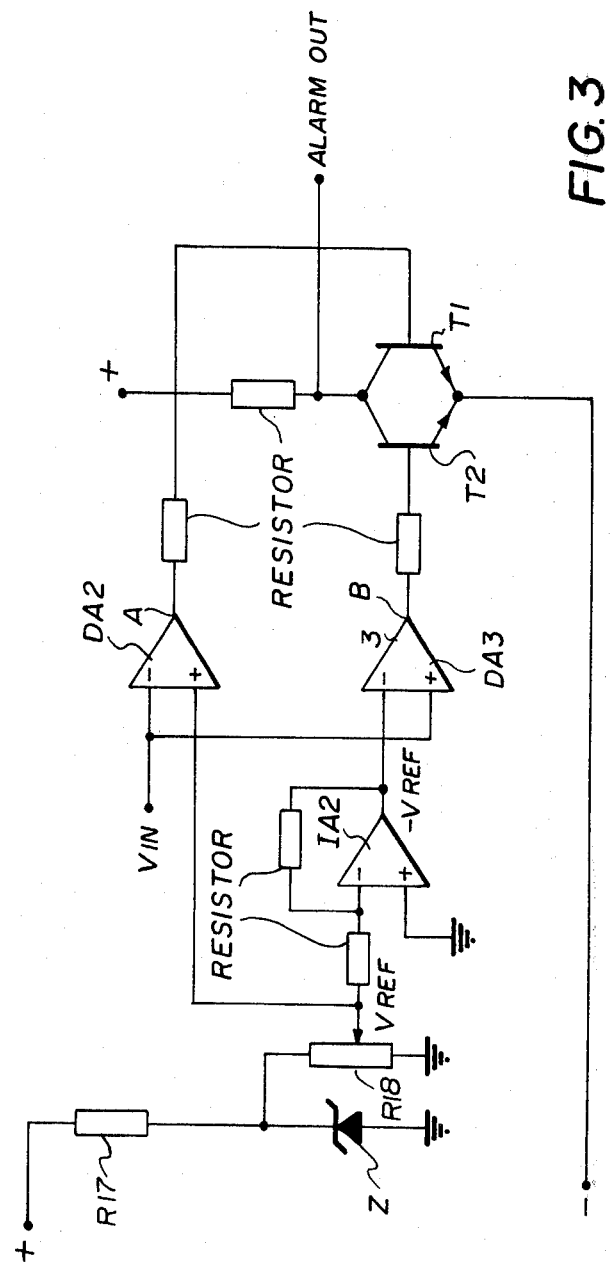
FIG. 3 is a circuit diagram of an alarm circuit shown in FIG. 1.

The alarm 14 shown in FIG. 1 will now be described in greater detail with reference to FIG. 3.

A zener diode Z is connected through a resistor R17 to a positive potential. A rheostat R 18 is connected across the zener diode Z and the output side of the rheostat is connected to the positive input of a differential amplifier DA2. The output side of the rheostat is also connected through an inverter IA2 to the negative input of a differential amplifier DA3.

The negative input of D2 and the positive input of DA3 are both connected to an input terminal Vin which is connected to the junction of resistors R12 and R13 of FIG. 2. Thus, if Vin is greater than the positive reference voltage established by rheostat R18, the output A of DA2 goes high and output B of DA3 goes low and if Vin is more negative than the negative reference voltage established at the output of inverter IA2, the output A goes low and output B goes high.

Output A is connected through a resistor to the base of an NPN transistor T1 the emitter of which is connected to a negative potential and the collector of which is connected through a resistor to a positive potential. Output B is connected through a resistor to the base of an NPN transistor T2 to the emitter of which is also connected to the negative potential and the collector of which is also connected to the positive potential through a resistor. When either output A or B is high transistor T1 or T2 is biased into conduction so that the collector potential becomes virtually identical to the emitter potential. Thus the collector potential becomes low and this is used as an alarm signal.

The double transistor arrangement T1, T2 operates as an OR gate which could take other forms, for example, a double diode arrangement in which inputs A and B are connected respectively through two diodes the cathodes of which are connected together.

It should be understood that the protective housing containing the sensors 11, 11' is, in use, secured to the surface or structure being tested or monitored by means of clamps, fasteners, cement, adhesives, magnetic bonds, soil anchors or any appropriate means.

The circuitry of FIG. 2 which derives an output voltage indicative of the tilt angle and direction of sensor 11 is, of course, duplicated for sensor 11'. The main portion of this combined circuitry up to and including R14 and excluding SR1 and SR2 which are incorporated in the sensor is incorporated in an interface module connected to the sensors 11 and 11' by leads. The interface module may be located adjacent or attached to the sensor housing or may be located some distance therefrom at a maximum distance determined by the losses and noise generated in the leads. A knob for varying resistance R4 to set the reference level, a knob for moving wiper W to provide proper calibration and means for varying the gain of DA1 and/or IA1 may be provided on the interface module.

The remainder of the circuitry to the right of R14 is incorporated in a monitor assembly at which the data from the interface module is displayed at any desired location remote from the sensors 11, 11'. The monitor can easily be adapted for use with more than one interface module and sensor assembly.

Figure 4:
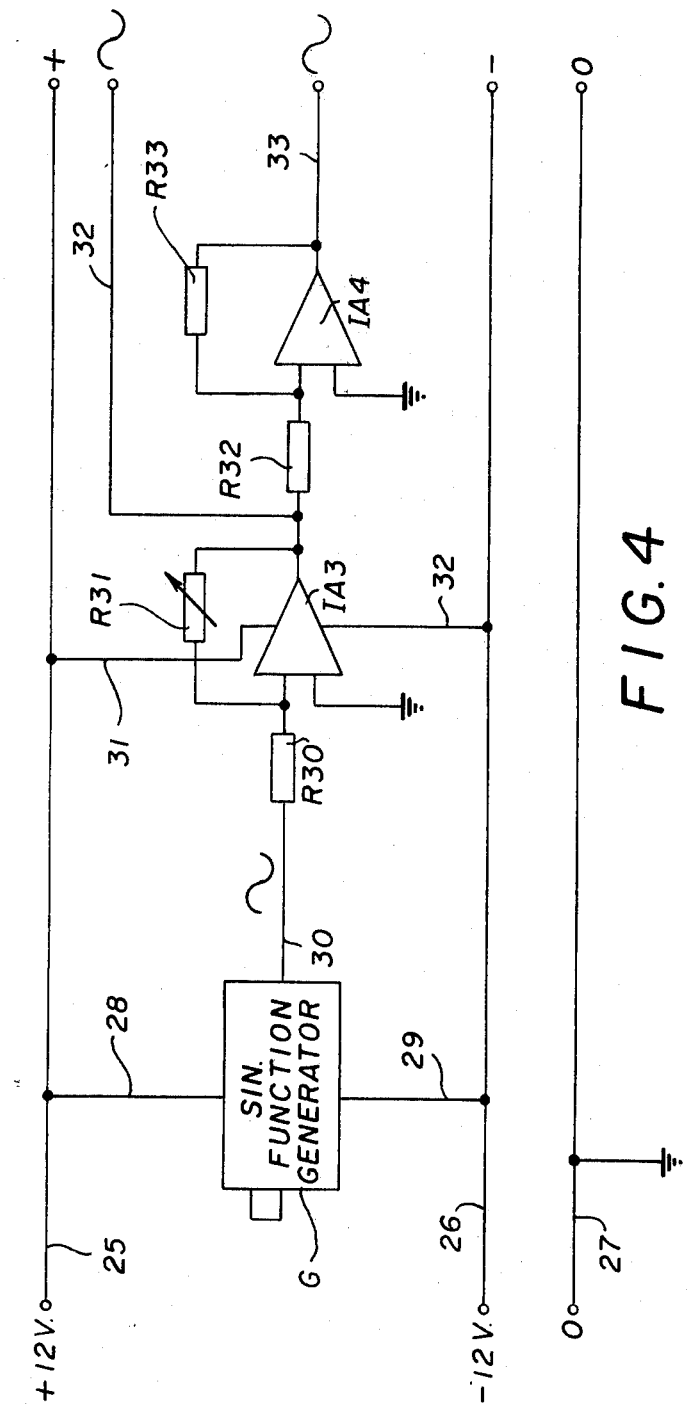
FIG. 4 is a circuit diagram of an alternate A.C. source which can be incorporated in the system of the invention.

As described, the two signals corresponding to the tilt angle and direction with respect to the two orthogonal axes are processed separately and independently but, of course the auxiliary outputs could be applied to further circuitry in order, for example, to obtain a representation of or value for the vector sum of these two signals.

Where a mains supply is not available, the transformer T1 may be replaced by a 24 volt battery feeding a function generator G shown in FIG. 4. The function generator is supplied by lines 25 and 26 connected across the 24 volt battery and representing connections to +12 volts and −12 volts, respectively. A zero volt terminal in the battery is grounded and connected to a line 27 which corresponds to the centre tap CT of FIG. 2. The connection of the function generator G is shown by two lines 28 and 29 but it should be understood that various resistors and capacitors would be connected between function generator G and lines 25 and 26 in a manner well known in the art.

The output of function generator G is taken on line 30 and passed through a resistor R30 to a negative input of an inverting amplifier IA3 which is biased by the +12 and −12 voltages by lines 31 and 32. A calibrating variable resistor R31 is connected in the feedback loop of amplifier IA3. The output of amplifier IA3 taken on line 32 is a sine wave relative to the zero voltage on line 27.

The output of amplifier IA3 is also passed through a resistor R32 and supplied to a negative input of an inverting amplifier IA4 having in its feedback loop a fixed resistance R33 equal in value to resistance R32 whereby it operates as an inverter providing an output voltage on line 33 equal in amplitude but opposite in phase to the voltage on line 32.

As stated, line 27 is equivalent to the centre tap CT and so line 27 replaces line CT in FIG. 2. Also, lines 32 and 33 are connected to resistors R1 and R2, respectively instead of windings S1 and S2.

Typical applications include the monitoring of cased lateral distortion, surveillance of dams, the study of slope stability and embankment settlement patterns, tower installation orientation, the monitoring of structural member deflection, monitoring pipeline hillside sideslip, in addition to offshore and laboratory applications.

The system according to the invention is not limited to applications in which the sensors are mounted in a fixed location. For example, the sensors are interface module may be combined in a rugged housing mounted rigidly on two runners to form a sled which can be pulled along a pipe the gradient of which is being analysed. In this case, as only one axis is of interest, only one sensor 11 or 11' is necessary and the auxiliary output is advantageously fed to a chart recorder so that a continuous record of the pipe geometry can be obtained. This record would show gradient in percent or degrees and would also pinpoint problem areas such as serious joint separation, settling and undulation.

What is claimed is:

1. A system for sensing deviation of a surface, structure or the like from a reference axis comprising a tilt sensitive transducer including a first and a second impedance the values of which vary differentially according to the angle and direction of tilt, means for applying an A.C. voltage across the first impedance, means for applying an antiphase A.C. voltage across the second impedance, rectifier means for deriving a positive D.C. voltage having a magnitude depending on the magnitude of the first impedance and deriving a negative D.C. voltage having a magnitude depending on the magnitude of the second impedance, means for adding the positive D.C. voltage and the negative D.C. voltage to derive a D.C. voltage the magnitude of which is dependent on the angle of tilt and the sign of which is dependent on the direction of tilt.

2. A system according to claim 1 in which the means for applying the A.C. voltage and the antiphase A.C. voltage is a transformer having a center tapped secondary winding.

3. A system according to claim 1 including a third and a fourth impedance connected respectively, to the means for applying the A.C. voltage and the means for applying the antiphase A.C. voltage, the third and the fourth impedances being selectively variable, and means for comparing, respectively, the voltages derived across the third, and fourth impedances with the voltages derived across the first and second impedances to derive two difference voltages which are supplied to the rectifier means whereby the positive D.C. signal derived has a magnitude dependent on the magnitude of the difference of the first and third voltages and the negative D.C. signal derived has a magnitude dependent on the magnitude of the difference of the second and fourth voltages.

4. A system according to claim 3 in which the means for comparing is a differential amplifier, two inputs of which are connected respectively to a junction of the first and second impedances and a junction of the third and fourth impedances.

5. A system according to claim 1 in which the means for applying the A.C. voltage and the antiphase A.C. voltage is a function generator supplied by equal magnitude positive and negative voltages from a battery, the function generator having an output connected to an amplifying means to derive at an output thereof the A.C. voltage, the output of the amplifying means being connected to an inverter to derive at an output thereof the antiphase A.C. voltage.

6. A system according to claim 2 or claim 5 including a third and a fourth impedance connected respectively, to the means for applying the A.C. voltage and the means for applying the antiphase A.C. voltage, the third and the fourth impedances being selectively variable, and means for comparing, respectively, the voltages derived across the third, and fourth impedances with the voltages derived across the first and second impedances to derive two difference voltages which are supplied to the rectifier means whereby the positive D.C. signal derived has a magnitude dependent on the magnitude of the difference of the first and third voltages and the negative D.C. signal derived has a magnitude dependent on the magnitude of the difference of the second and fourth voltages.

7. A system according to claim 1, 2 or 5 including means comparing the voltage derived by the adding means with predetermined positive and negative voltages and means instigating an alarm when the voltage derived exceeds in magnitude the predetermined positive or negative voltages.

* * * * *